US010316693B2

(12) United States Patent
Stolte et al.

(10) Patent No.: US 10,316,693 B2
(45) Date of Patent: Jun. 11, 2019

(54) AIRCRAFT TAIL REGION WITH A COOLING SYSTEM INSTALLED IN AIRCRAFT TAIL REGION

(71) Applicant: Airbus Operations GmbH, Hamburg (DE)

(72) Inventors: Ralf-Henning Stolte, Hamburg (DE); Udo Krause, Hamburg (DE); Bruno Stefes, Hamburg (DE); Christian Mueller, Hamburg (DE); Florian Elken, Hamburg (DE); Uwe Wollrab, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 1110 days.

(21) Appl. No.: 14/035,585

(22) Filed: Sep. 24, 2013

(65) Prior Publication Data
US 2014/0023479 A1    Jan. 23, 2014

Related U.S. Application Data

(63) Continuation of application No. PCT/EP2012/001288, filed on Mar. 23, 2012.
(Continued)

(30) Foreign Application Priority Data

Mar. 25, 2011  (DE) ........................ 10 2011 015 126

(51) Int. Cl.
*B64D 33/10* (2006.01)
*B64D 41/00* (2006.01)
*F01D 25/12* (2006.01)

(52) U.S. Cl.
CPC ............. *F01D 25/12* (2013.01); *B64D 33/10* (2013.01); *B64D 2041/005* (2013.01); *Y02T 90/36* (2013.01)

(58) Field of Classification Search
CPC ................................ F01D 25/12; B64D 33/10
(Continued)

(56) References Cited

U.S. PATENT DOCUMENTS 2,268,183 A * 12/1941 Bugatti .................. B64D 33/10
244/57
5,865,398 A *  2/1999 Pashea .................. B64D 33/02
244/53 B
(Continued)

FOREIGN PATENT DOCUMENTS

DE    10 2009 009141    8/2010
WO       2010105744    9/2010
(Continued)

OTHER PUBLICATIONS

English translation of WO 2010105744.*
Chinese Office Action, dated Jun. 2, 2015.
International Search Report, dated Aug. 2, 2012.

*Primary Examiner* — Steven B McCallister
*Assistant Examiner* — Allen R Schult
(74) *Attorney, Agent, or Firm* — Greer, Burns & Crain, Ltd.

(57) ABSTRACT

An aircraft tail region including a cooling system installed in the aircraft tail region. The cooling system comprises a cooler, which forms a section of an outer skin of the aircraft tail region, and includes coolant channels allowing a flow of ambient air therethrough, and extending from a first surface of the cooler to a second surface of the cooler. The cooling system also includes a fan system, which is adapted to convey ambient air through the coolant channels of the cooler at least in specified operating phases of the cooling system, and a first opening, which is formed in the outer skin of the aircraft tail region, and which allows, in conveying operation of the fan system, ambient air which is supplied through the coolant channels of the cooler into an interior of
(Continued)

the aircraft tail region to be discharged back into the aircraft environment.

21 Claims, 8 Drawing Sheets

Related U.S. Application Data

(60) Provisional application No. 61/467,422, filed on Mar. 25, 2011.

(58) Field of Classification Search
USPC .......................................................... 454/79
See application file for complete search history.

(56) References Cited

U.S. PATENT DOCUMENTS

| | | |
|---|---|---|
| 2004/0155157 A1 | 8/2004 | Bray |
| 2010/0236503 A1* | 9/2010 | Bernt .................. B60K 11/085 123/41.05 |
| 2011/0017426 A1* | 1/2011 | Baumgardt ............. B64C 21/06 165/59 |

FOREIGN PATENT DOCUMENTS

| | | | |
|---|---|---|---|
| WO | WO 2010105744 A2 * | 9/2010 | ............ F28F 13/003 |
| WO | 2010136710 | 12/2010 | |

* cited by examiner

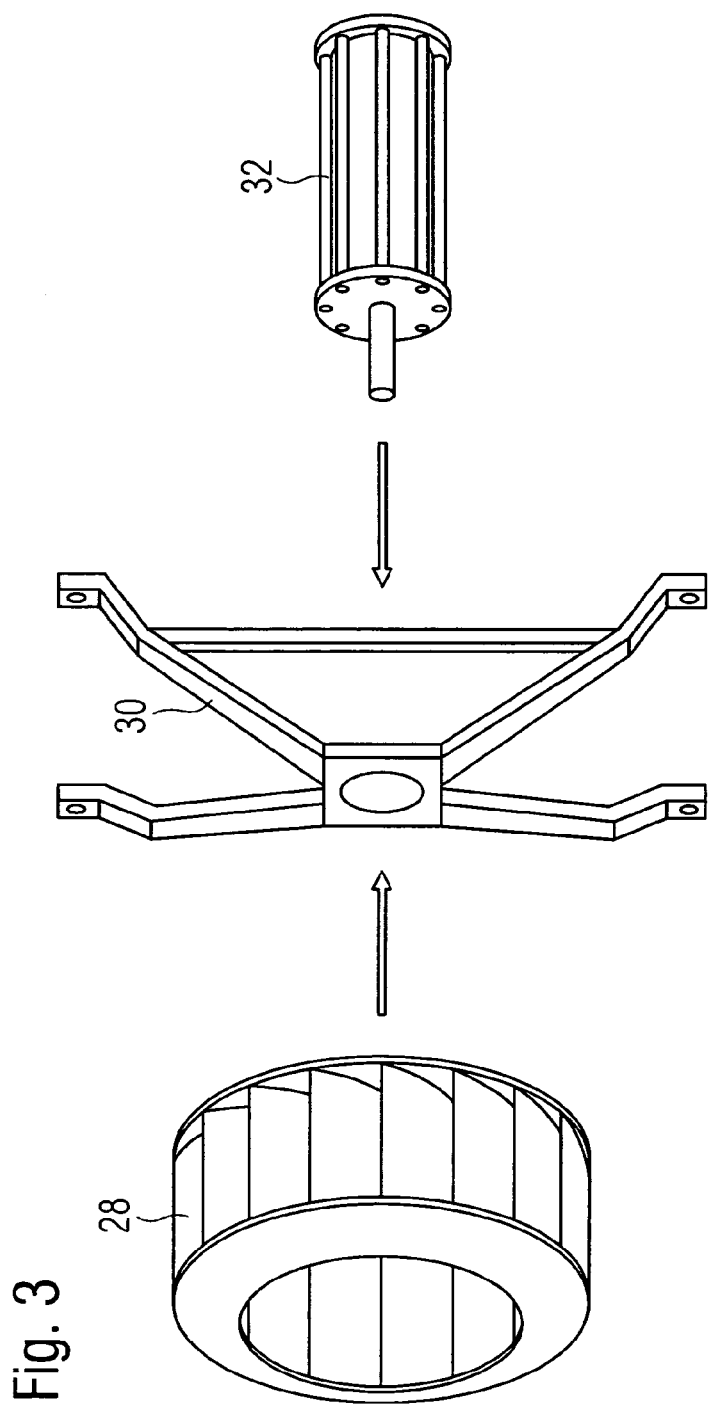

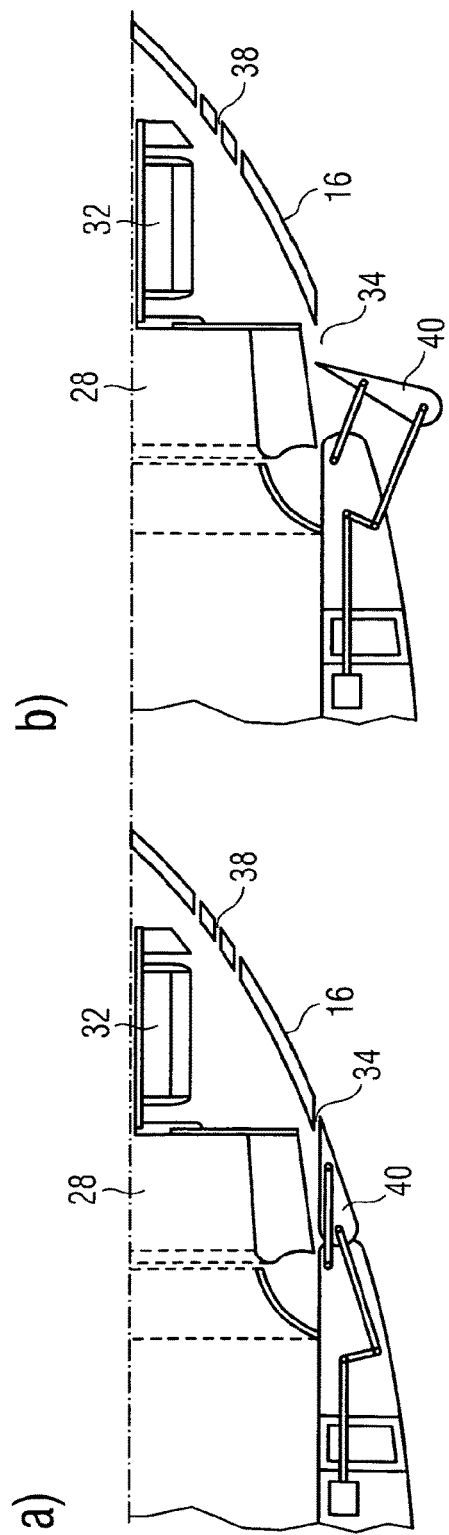

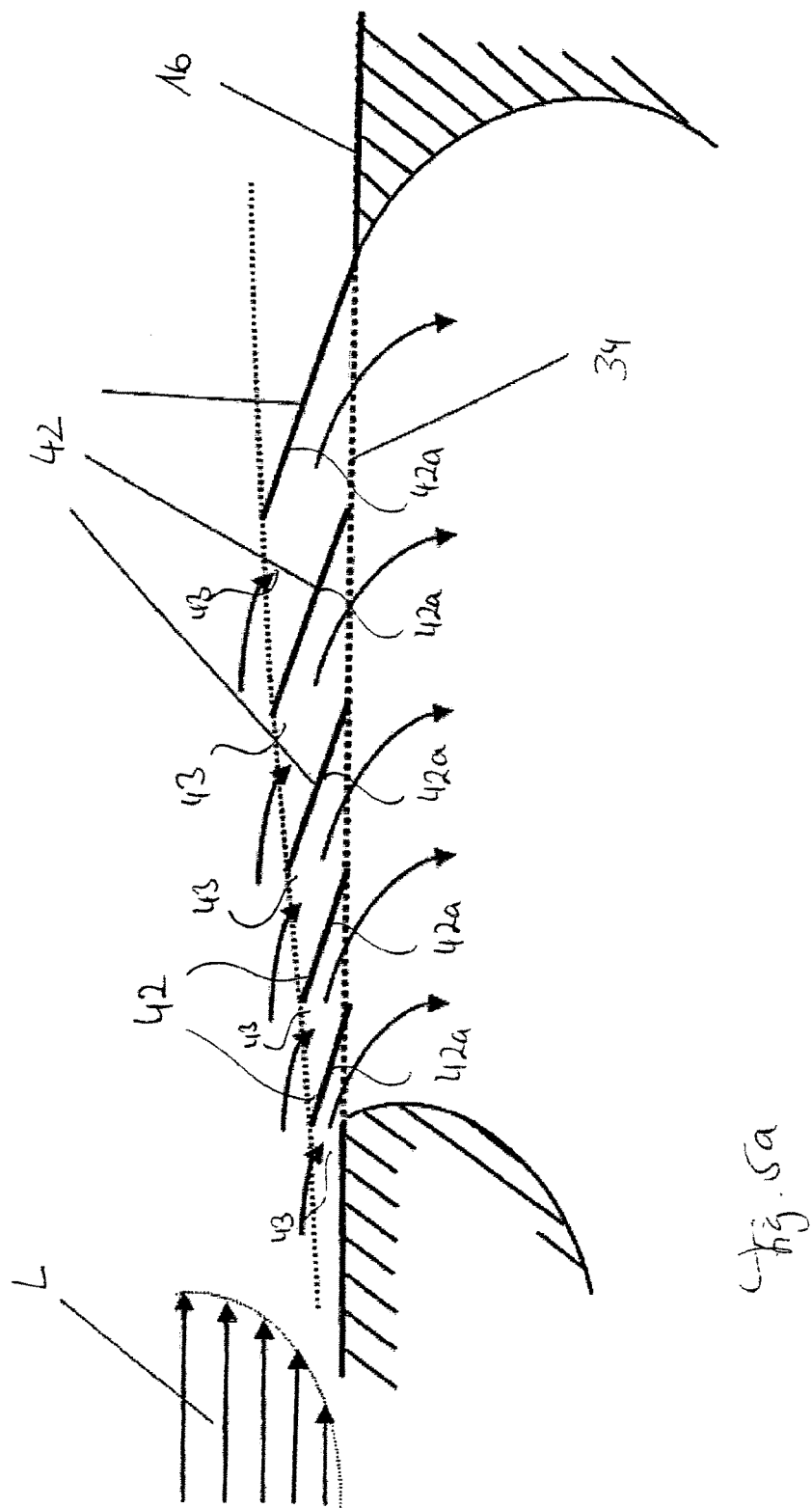

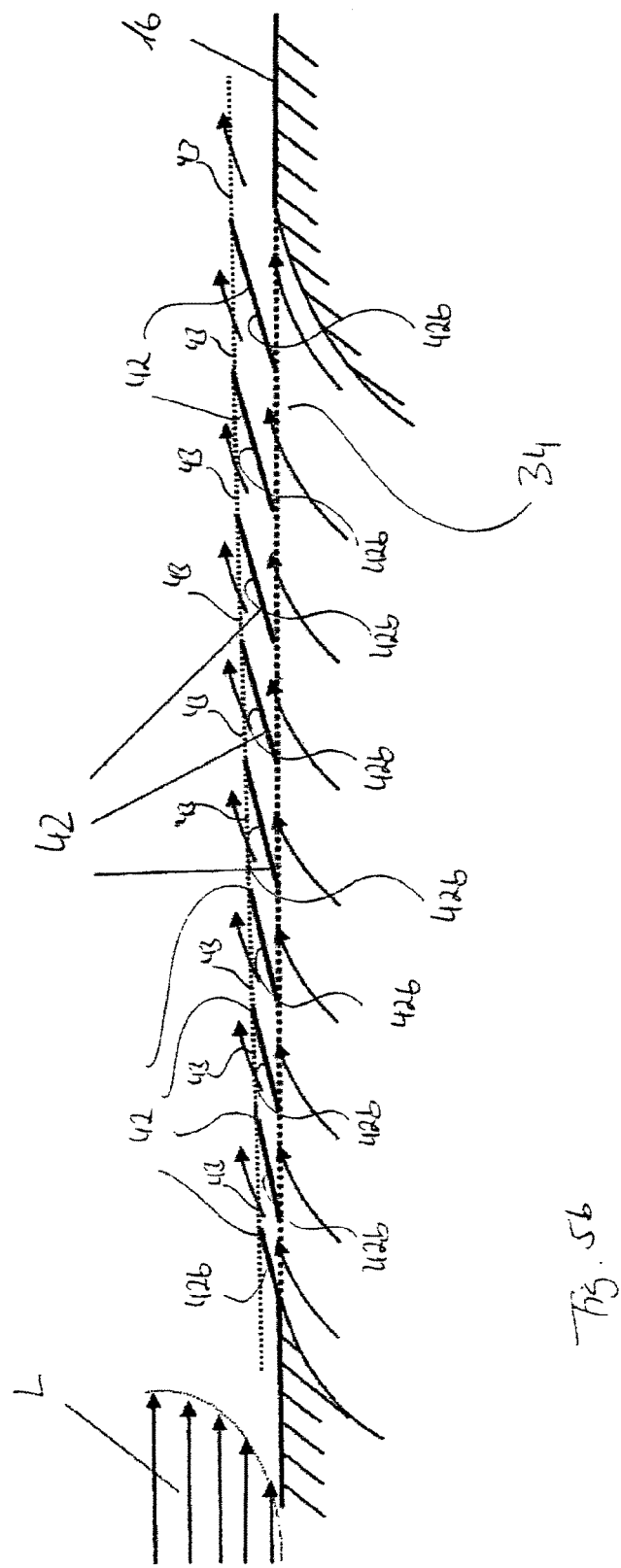

Fig. 6
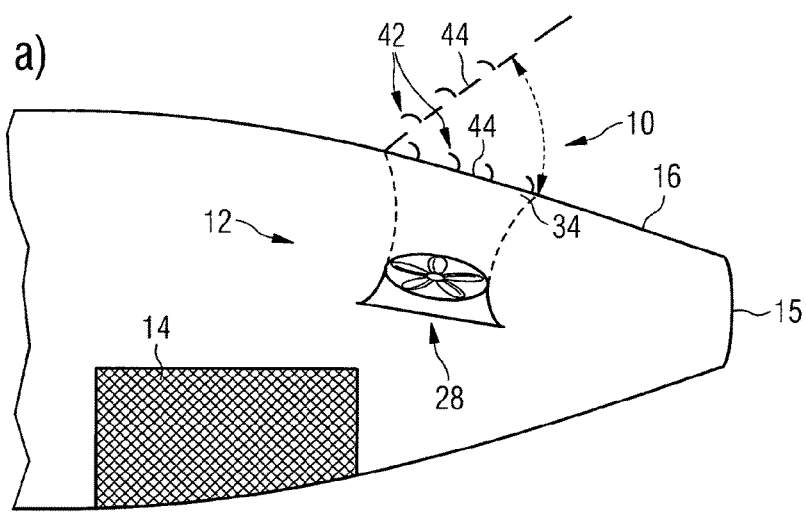
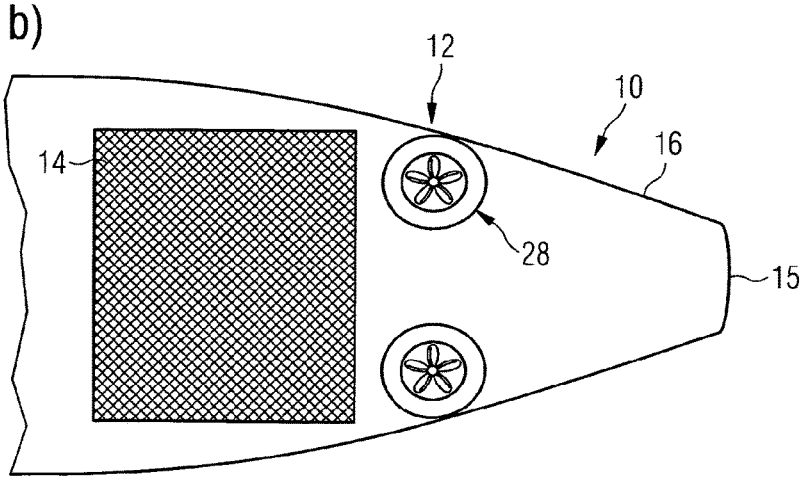

Fig. 7
a)
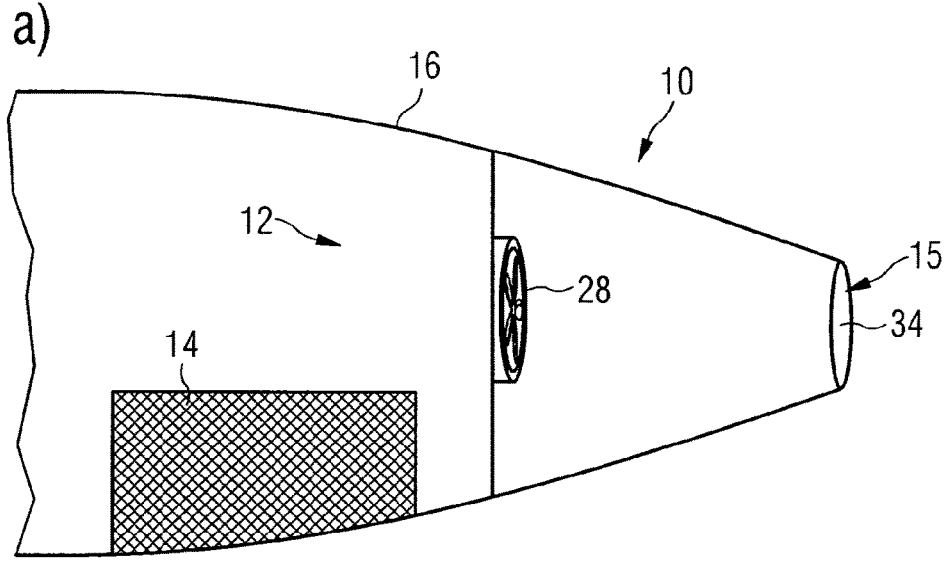
b)
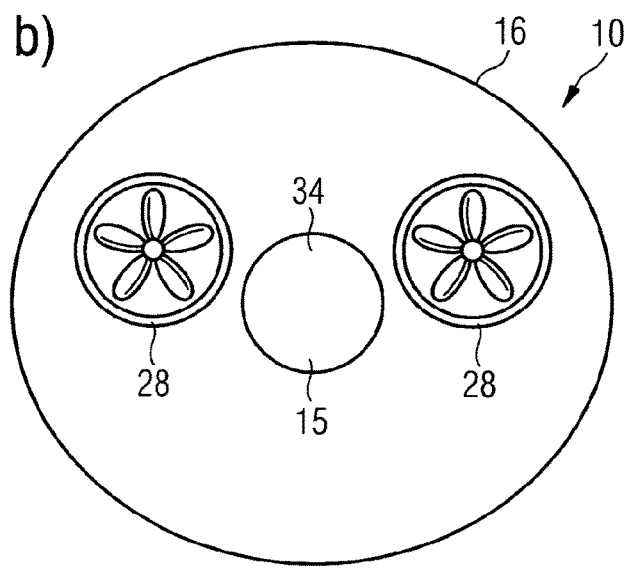

AIRCRAFT TAIL REGION WITH A COOLING SYSTEM INSTALLED IN AIRCRAFT TAIL REGION

CROSS-REFERENCES TO RELATED APPLICATIONS

This application is a continuation of International Application PCT/EP2012/001288 filed Mar. 23, 2012, designating the United States and published on Oct. 4, 2012 as WO 2012/130418. This application also claims the benefit of the U.S. Provisional Application No. 61/467,422, filed on Mar. 25, 2011, and of the German patent application No. 10 2011 015 126.5 filed on Mar. 25, 2011, the entire disclosures of which are incorporated herein by way of reference.

BACKGROUND OF THE INVENTION

The invention concerns an aircraft tail region with a cooling system installed in the aircraft tail region, and a method of operating a cooling system installed in the aircraft tail region.

Fuel cell systems make it possible to generate electrical current with low emissions and high efficiency. At present there are therefore efforts to use fuel cell systems in various mobile applications, e.g., in automotive engineering or aviation, to generate electrical energy. For example, in an aircraft, replacing the generators which are currently used for on-board power supply, and are driven by the main engines or auxiliary power units (APUs), with a fuel cell system is conceivable. A fuel cell system could also be used for emergency power supply to the aircraft, and to replace the ram air turbine (RAT) which has been used until now as the emergency power unit.

As well as electrical energy, a fuel cell in operation generates thermal energy, which must be carried away from the fuel cell using a cooling system, to prevent overheating of the fuel cell. A fuel cell system which is used in an aircraft, e.g., for on-board power supply, must be designed so that it is capable of covering a high requirement for electrical energy. However, a powerful fuel cell from the point of view of generating electrical energy also generates a large quantity of thermal energy, and therefore has a high cooling requirement. Additionally, on board an aircraft many further technical devices, which generate heat and must be cooled to ensure safe operation, are provided. These technical devices include, for example, air-conditioning units or electronic control components of the aircraft.

Aircraft cooling systems which are currently used include air inlet openings, which are usually provided in the region of the aircraft outer skin, and which for example can be in the form of ram air inlets, and are used to convey ambient air as coolant into the aircraft cooling system. Cooling air which is heated by receiving heat from devices to be cooled on board the aircraft is usually carried back into the environment through air outlet openings, which are also provided in the region of the aircraft outer skin. However, air inlet openings and air outlet openings which are formed in the aircraft outer skin increase the air resistance, and thus the fuel consumption of the aircraft. Also, aircraft cooling systems which are supplied with cooling air via ram air inlets have high pressure losses, cooling power which is limited among other things by the maximum incoming air volume flow through the ram air inlets, and relatively high weight.

From WO 2010/105744 A2, an aircraft cooling system which is suitable for cooling a fuel cell system, and which includes a cooler with coolant channels through which ambient air can flow, is known. The coolant channels are formed in a matrix body of the cooler, the outer surface of which, when the cooler is fitted in an aircraft, forms an outer surface of the aircraft outer skin. In contrast, an inner surface of the matrix body, when the cooler is fitted in an aircraft, forms an inner surface of the aircraft outer skin. In flying operation of an aircraft equipped with the cooling system, the coolant flow through the coolant channels which are formed in the matrix body of the cooler is controlled so that the coolant enters the coolant channels which are formed in the matrix body in the region of the outer surface of the matrix body, and leaves the coolant channels which are formed in the matrix body in the region of the inner surface of the matrix body. The cooling air is carried out of the aircraft through an opening which is formed in the region of a transom of the aircraft. In contrast, in ground operation of the aircraft the coolant flow is controlled so that cooling air is fed in through the opening which is formed in the region of the transom of the aircraft. The cooling air then flows through the coolant channels which are formed in the matrix body of the cooler, from the inner surface of the matrix body in the direction of the outer surface of the matrix body.

SUMMARY OF THE INVENTION

This invention is based on the object of providing an aircraft tail region in which an energy-efficient aircraft cooling system which can be operated with low noise and is also suitable for carrying away large thermal loads from a heat generating device, e.g., a fuel cell system, on board the aircraft, is installed. The invention is also based on the object of giving a method of operating such an aircraft cooling system installed in an aircraft tail region.

An aircraft tail region according to the invention includes a cooling system installed in the aircraft tail region, with a cooler which forms a section of an outer skin of the aircraft tail region. Preferably, the cooler is arranged in a lower shell region of the aircraft tail region, said lower shell region facing the ground in operation of the aircraft tail region. The cooler has a shape, size and structural properties which make it possible to use the cooler as an aircraft outer skin section. In particular, the cooler comprises a material which makes it possible to use the cooler as an aircraft outer skin section. For example, a main body of the cooler may comprise a metal or a plastic material, in particular a fibre-reinforced plastic material. The cooler is preferably mounted detachably, meaning that the cooler is preferably mounted on corresponding supporting elements, e.g., components of the aircraft structure, and/or fixed to sections of the aircraft outer skin adjacent to the cooler, so that the cooler can be at least partly detached from its position comparatively easily. In this way, components which are arranged within the aircraft tail region can be made conveniently accessible for replacement or maintenance purposes. Fitting an additional access door, which makes access to the interior of the aircraft tail region possible, is then unnecessary. This makes it possible to achieve additional weight savings.

The cooler includes coolant channels allowing a flow of ambient air therethrough, and extending from a first surface of the cooler, which forms an outer surface of the aircraft outer skin, to a second surface of the cooler, which forms an inner surface of the aircraft outer skin. The cooler may be provided only with coolant channels, through which a coolant of a heat-generating device on board the aircraft may be fed for direct cooling. Alternatively, however, the cooler may also be in the form of a heat exchanger. In the cooler, as well as multiple coolant channels, multiple thermal transfer medium channels, through which a thermal transfer medium to be cooled can flow in operation of the cooler, may be formed. If coolant is carried through the coolant channels, the cooling energy contained in the coolant can be transferred to the thermal transfer medium to be cooled, so that the thermal transfer medium is cooled. Finally, using the cooler both as a heat exchanger and to carry coolant for direct cooling of a heat-generating device on board an aircraft is conceivable. Then, when the coolant flows through the cooler, it can deliver cooling energy to a thermal transfer medium, and additionally, before or after flowing though the cooler, be used for direct cooling of a heat-generating component or heat-generating system on board the aircraft.

The cooler may also include multiple ribs, which extend from the first surface of the cooler. The ribs are preferably adapted to act as flow baffles, i.e., to guide an airflow which flows over the first cooler surface, e.g., in flying operation of the aircraft, in a desired direction over the first cooler surface. A further advantage of the version of the cooler with multiple ribs extending from the first cooler surface is that the ribs protect the cooler, and in particular the first cooler surface, from external influences. To minimize the frictional resistance caused by the ribs in flying operation of the aircraft, and to make even flow over the first cooler surface possible, the ribs are preferably aligned essentially parallel to flow lines of an airflow which flows over the first surface of the cooler in flying operation of the aircraft. The ribs may also have a contour which is curved in the direction of the first cooler surface. The ribs which extend from the first cooler surface may comprise the same material as the main body of the cooler, but also of a different material. For example, the ribs may comprise a metal or a plastic material, preferably a fibre-reinforced plastic material. For example, in the aircraft tail region according to the invention, a cooler described in WO 2010/105744 A2 can be used.

The aircraft tail region according to the invention also includes a fan system, which is adapted to convey ambient air through the coolant channels of the cooler at least in specified operating phases of the cooling system. The operation of the fan system may be controlled by means of a suitable control unit. The control unit may be adapted to control the fan system so that the fan system, in particular in ground operation of an aircraft equipped with the aircraft tail region, conveys ambient air through the coolant channels of the cooler. Thus even in ground operation of the aircraft, proper flow through the coolant channels of the cooler and consequently proper functioning of the cooling system are ensured. However, if required, the control unit may control the fan system even in flying operation of the aircraft so that it conveys ambient air through the coolant channels of the cooler.

Finally, the aircraft tail region according to the invention includes a first opening which is formed in the outer skin of the aircraft tail region, and which allows, in conveying operation of the fan system, ambient air which is supplied through the coolant channels of the cooler into an interior of the aircraft tail region to be discharged back into the aircraft environment.

The aircraft tail region according to the invention has the advantage that the cooler replaces a component which is present in the aircraft tail region in any case, namely a section of the aircraft outer skin. The cooler thus requires no or, according to its thickness, only a little additional installation space. The cooler also causes a comparatively small additional weight. Finally, the cooler, compared with conventional systems, enables a multiplication of the area through which coolant may flow. In this way the cooler provides very high cooling power and also causes only very small pressure losses. Therefore, the cooler can be used in a specially advantageous manner on board an aircraft to carry away large thermal loads from a heat-generating device, e.g., a fuel cell system, very efficiently.

Preferably, the cooler forms a section of an outer skin of the aircraft tail region, said section being arranged at a first distance from a transom of the aircraft tail region. For example, the distance of the cooler from the transom of the aircraft tail region may be chosen so that the cooler is reliably outside an aircraft tail region section which could be affected by a tail strike (ground contact of the aircraft tail region when the aircraft takes off). The fan system is preferably arranged at a second distance from the transom of the aircraft tail region, the second distance being less than the first distance.

In a preferred embodiment of the aircraft tail region according to the invention, the cooler and the first opening which is formed in the outer skin of the aircraft tail region are positioned relative to each other so that at least in specified operating phases of the cooling system, ambient air is supplyable through the first opening into the interior of the aircraft tail region, and dischargeable back through the coolant channels of the cooler into the aircraft environment, driven by differential pressure. In other words, the cooler is preferably arranged in a region of the outer skin of the aircraft tail region onto which, in flying operation of an aircraft equipped with the aircraft tail region, a lower pressure acts than onto the first opening For example, the first opening may be arranged at a lower distance from the transom of the aircraft tail region than the cooler. In the case of such a version of the aircraft tail region according to the invention, in flying operation of the aircraft, pressure differences which are present in any case in the region of the aircraft outer skin can be used to convey the coolant through the coolant channels of the cooler and finally back to the aircraft environment through the first opening, which acts as a coolant outlet. The fan system can then be operated with less power at least in some operating phases of the aircraft cooling system, and consequently if required be designed to be less powerful and thus more compact and of less weight. However, at least it is unnecessary to operate the fan system always in the range of its maximum power, so that the lifetime of the fan system can be increased and its maintenance liability can be reduced.

The cooling system which is integrated in the aircraft tail region according to the invention can thus, e.g., under the control of the control unit of the fan system, be operated in various operating phases and different operating modes. For example, the control unit may control the coolant flow by corresponding operation of the fan system in ground operation of the aircraft, in such a way that the coolant flows through the coolant channels of the cooler from outside to inside, and finally is discharged back from the interior of the aircraft tail region into the aircraft environment via the first opening In contrast, in flying operation of the aircraft, the coolant flow may be controlled, e.g., by corresponding positioning of the cooler and the first opening, so that the coolant is supplied via the first opening into the interior of the aircraft tail region, and finally flows through the coolant channels of the cooler from inside to outside.

In the outer skin of the aircraft tail region, at least one second opening may be formed, and ambient air may be supplied through it to the driving device for driving the fan system for cooling. The second opening is preferably positioned so that ambient air which flows through the second opening into the interior of the aircraft tail region flows directly over the driving device for driving the fan system. Preferably, the second opening is arranged at a lesser distance from the transom of the aircraft tail region than the first opening In the region of the first and/or second opening formed in the outer skin of the aircraft tail region, multiple lamellae, which essentially extend parallel to each other, may be provided. The lamellae may be adjustable in steps or continuously between a closed position in which they define a closed surface which cannot be flowed through and at least one open position in which they define a surface allowing to be flowed through via corresponding through-flow slits. By corresponding control of the position of the lamellae, the air volume flow which is fed via the first and/or second opening formed in the outer skin of the aircraft tail region into the interior of the aircraft tail region can be controlled flexibly as desired, depending on the cooling air requirement of the cooling system. Additionally, because of the flexible adjustability of the position of the lamellae depending on the cooling air requirement of the cooling system, optimization of the air resistance and consequently fuel consumption of the aircraft is made possible, since the ram effect of the lamellae in flying operation of the aircraft can always be chosen to be only as high as is necessary to achieve the desired air volume flow in the interior of the aircraft tail region.

The lamellae may be integrated into an outer skin contour of the aircraft tail region in the region of the first and/or second opening formed in the outer skin of the aircraft tail region, so that they seal or release the first and/or second opening directly, depending on their positions. However, alternatively the lamellae may be integrated into a flap, which itself is adjustable in steps or continuously between a closed position in which it seals the first and/or second opening formed in the outer skin of the aircraft tail region, and an open position in which it releases the first and/or second opening formed in the outer skin of the aircraft tail region. Such a configuration makes possible specially flexible control of the air volume flow which is supplied into the interior of the aircraft tail region, since on the one hand the flap itself, and on the other hand the lamellae, can be brought into corresponding positions to control the air volume flow. Integration of the lamellae into an outer skin contour of the aircraft tail region in the region of the first and second openings formed in the outer skin of the aircraft tail region is possible. Additionally, the lamellae, both in the region of the first and in the region of the second opening formed in the outer skin of the aircraft tail region, may be integrated into a flap. Finally, configurations in which the lamellae are integrated into an outer skin contour of the aircraft tail region in the region of one opening, and into a flap in the region of the other opening, are conceivable.

The lamellae are preferably adjustable into a first open position or a second open position, according to choice. In the first open position of the lamellae, an airflow which flows around the outer skin of the aircraft tail region in flying operation of the aircraft may flow onto an inner surface of the lamellae, which in the closed position of the lamellae faces an interior of the aircraft tail region. In this way, the lamellae can steer the air through the first and/or second opening into the interior of the aircraft tail region. In contrast, in the second open position of the lamellae, an airflow which flows around the outer skin of the aircraft tail region in flying operation of the aircraft may flow onto an outer surface of the lamellae, which in the closed position of the lamellae faces away from an interior of the aircraft tail region.

In their first open position, the lamellae generate a high ram pressure in the airflow which flows around the outer skin of the aircraft tail region in flying operation of the aircraft, and consequently make it possible to feed a large air volume flow into the interior of the aircraft tail region. However, this results in an increase of the air resistance and thus fuel consumption of the aircraft. In the second open position of the lamellae, the ram pressure which the lamellae generate in the airflow which flows around the outer skin of the aircraft tail region in flying operation of the aircraft, and consequently the air resistance which the lamellae generate, is significantly less. If only a little air is to be fed into the interior of the aircraft tail region, or if air is to be carried out of the interior of the aircraft tail region into the environment through the through-flow slits which the lamellae define, it is therefore useful to position the lamellae in their second open position, to avoid increasing the air resistance and therefore the fuel consumption of the aircraft unnecessarily.

The fan system of the aircraft tail region according to the invention may include two axial fans, which may be operated redundantly. However, preferably the fan system includes a radial fan. A "radial fan" here is understood to be a fan which sucks air in an axial direction, i.e., in a direction parallel to the axis of rotation of the fan, deflects it by 90° and finally carries it away in a radial direction. A radial fan makes it possible to implement large pressure increases, and in operation reacts insensitively to fluctuations in the flow of air fed to the fan. This makes specially efficient operation of the cooling system possible. At the same time, it may be possible to do without additional fans, and consequently operation of the cooling system with low noise may be achieved.

The first opening which is formed in the outer skin of the aircraft tail region is preferably positioned radially relative to the radial fan of the fan system. Through it, in operation of the radial fan, after flowing through the coolant channels of the cooler, cooling air can be fed specially efficiently out of the interior of the aircraft tail region back into the aircraft environment through the first opening, with low loss.

A driving device for driving the radial fan may extend from the radial fan in the direction of the transom of the aircraft tail region. The driving device may be in the form of an electric motor or similar, for example. A driving device which extends from the radial fan in the direction of the transom of the aircraft tail region is easily and conveniently accessible for maintenance and repair purposes. The driving device can also be replaced quickly if required.

A fuel tank of a fuel cell system may be positioned between the cooler and the fan system. The fuel tank may, for example, be adapted to receive hydrogen. In all operating phases of the cooling system, cooling air flows over a fuel tank which is positioned between the cooler and the fan system, and which consequently is always optimally ventilated. This increases the safety of the tank.

In a method according to the invention for operating a cooling system installed in an aircraft tail region as described above, with a cooler which forms a section of an outer skin of the aircraft tail region and includes coolant channels allowing a flow of ambient air therethrough, and extending from a first surface of the cooler to a second surface of the cooler, a fan system, and a first opening which is formed in the outer skin of the aircraft tail region, the fan system, at least in specified operating phases of the cooling system, conveys ambient air through the coolant channels of the cooler into an interior of the aircraft tail region. The ambient air which is supplied through the coolant channels of the cooler into the interior of the aircraft tail region in conveying operation of the fan system is discharged back into the aircraft environment through the first opening, which is formed in the outer skin of the aircraft tail region.

At least in specified operating phases of the cooling system, ambient air may be supplied through the first opening into the interior of the aircraft tail region, and discharged back through the coolant channels of the cooler into the aircraft environment, driven by differential pressure.

Ambient air may be fed through at least one second opening, which is formed in the outer skin of the aircraft tail region, to a driving device for driving the fan system for cooling.

In the region of the first and/or second opening formed in the outer skin of the aircraft tail region, multiple lamellae, which essentially extend parallel to each other, may be provided. The lamellae may be adjusted, depending on the operating state of the cooling system, in steps or continuously between a closed position in which they define a closed surface and at least one open position in which they define a surface allowing to be flowed through via corresponding through-flow slits.

The lamellae may be integrated into an outer skin contour of the aircraft tail region in the region of the first and/or second opening formed in the outer skin of the aircraft tail region. The lamellae may also be integrated into a flap, which itself is adjusted, depending on the operating state of the cooling system, in steps or continuously between an open position, in which it seals the first and/or second opening formed in the outer skin of the aircraft tail region, and an open position, in which it releases the first and/or second opening formed in the outer skin of the aircraft tail region.

The lamellae may be adjusted, depending on the operating state of the cooling system, into a first open position or a second open position, according to choice. In the first open position of the lamellae, an airflow which impinges around the outer skin of the aircraft tail region in flying operation of the aircraft impinges onto an inner surface of the lamellae, which in the closed position of the lamellae faces an interior of the aircraft tail region. In contrast, in the second open position of the lamellae, an airflow which flows around the outer skin of the aircraft tail region in flying operation of the aircraft impinges onto an outer surface of the lamellae, which in the closed position of the lamellae faces away from an interior of the aircraft tail region.

Ambient air which is supplied into the interior of the aircraft tail region may flow over a fuel tank of a fuel cell system, which is positioned between the cooler and the radial fan, for cooling.

BRIEF DESCRIPTION OF THE DRAWINGS

Preferred embodiments of the invention are now explained in more detail on the basis of the attached schematic drawings, of which FIG. 3 shows a three-dimensional exploded view of a radial fan of the cooling system, FIGS. 4a and 4b show detailed representations of a first opening which is formed in an outer skin of the aircraft tail region, and which can be sealed by a conventional sealing flap, FIGS. 5a and 5b show detailed representations of a first opening which is formed in an outer skin of the aircraft tail region, and in the region of which multiple lamellae are integrated into an outer skin contour of the aircraft tail region, FIGS. 6a and 6b show a side view and plan view of a second embodiment of a aircraft tail region with a cooling system installed in the aircraft tail region, and FIGS. 7a and 7b show a side view and rear view of a third embodiment of a aircraft tail region with a cooling system installed in the aircraft tail region.

DETAILED DESCRIPTION OF THE PREFERRED EMBODIMENTS

Figure 1:
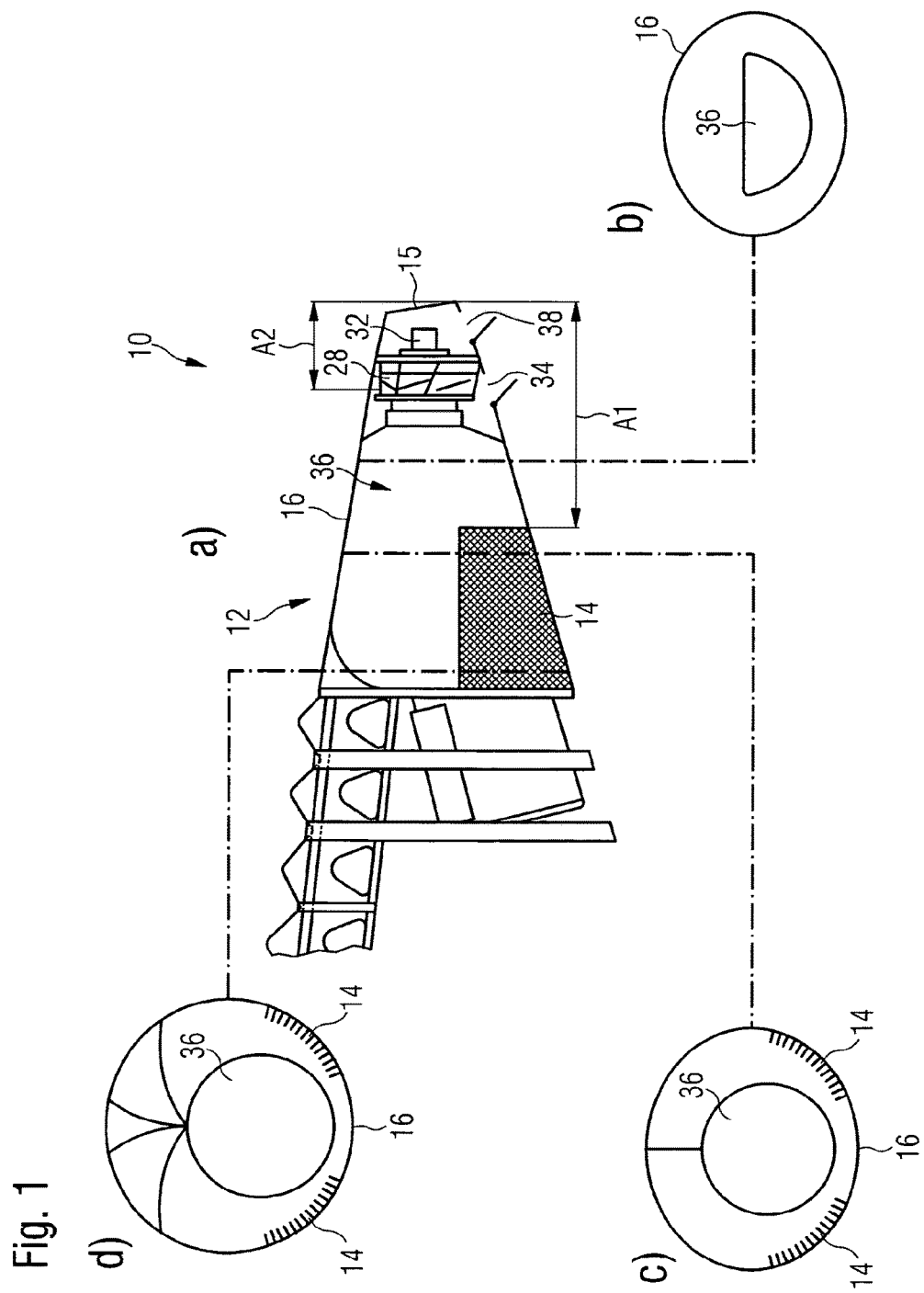
FIGS. 1a to 1d show a representation of a first embodiment of an aircraft tail region with a cooling system installed in the aircraft tail region.

In FIGS. 1a to 1d, a first embodiment of an aircraft tail region 10, in which a cooling system 12 is installed, is shown. A cooler 14 of the cooling system 12 forms a section of an outer skin 16 of the aircraft tail region 10, said section being arranged at a first distance Al from a transom 15 of the aircraft tail region 10. In particular, the distance Al of the cooler 14 from the transom 15 of the aircraft tail region 10 is chosen so that the cooler 14 is reliably outside a section of the aircraft tail region 10 which could be affected by a tail strike. The cooler 14 is arranged in a lower shell region of the aircraft tail region 10, said lower shell region facing the ground in operation of the aircraft tail region 10.

A main body of the cooler 14 comprises a material, e.g., a metal or a plastic material, in particular a fibre-reinforced plastic material, the mechanical properties of which are adapted to the requirements which are set for an aircraft outer skin section. This ensures that the cooler 14 meets the structural requirements which result from its positioning in the region of the aircraft outer skin. The cooler 14 is mounted detachably on corresponding supporting elements, e.g., components of the aircraft structure, and/or fixed to sections of the aircraft outer skin adjacent to the cooler 4. Thus the cooler 14 can be detached from its position comparatively easily, and can make components which are arranged within the aircraft tail region 10 conveniently accessible for replacement or maintenance purposes.

Figure 2:
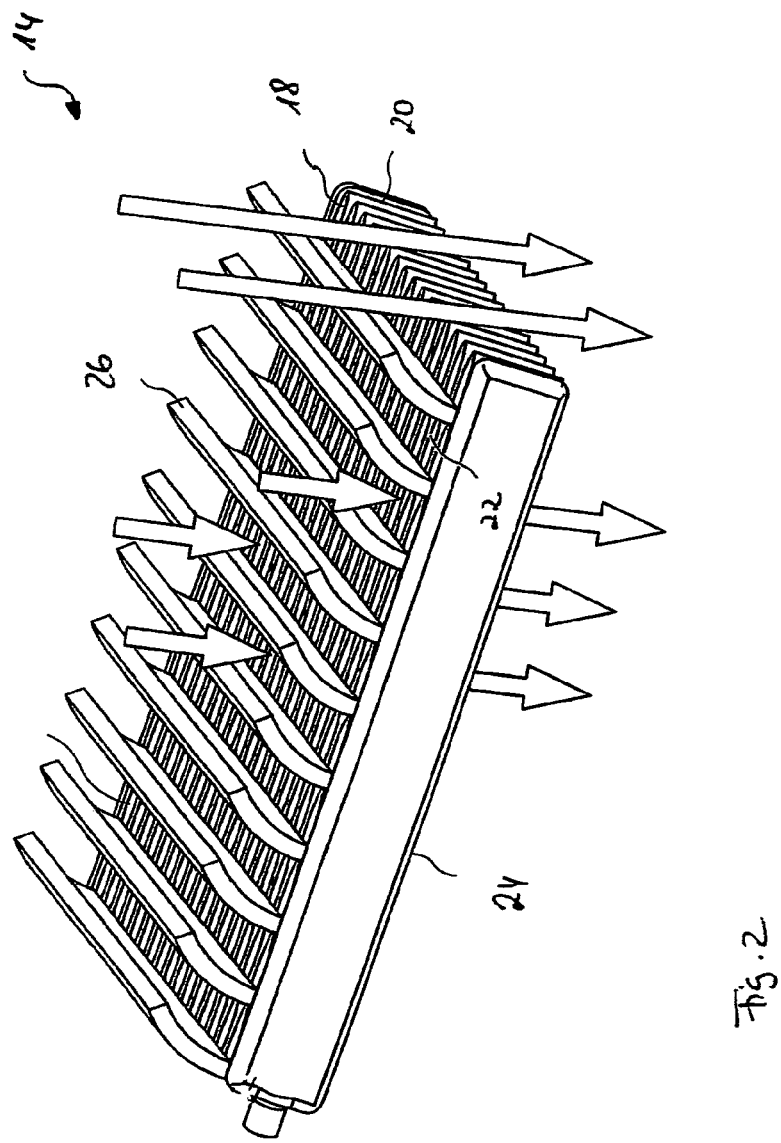
FIG. 2 shows a detailed representation of a cooler of the cooling system.

As can be seen in the detailed representation of the cooler 14 in FIG. 2, the main body of the cooler 14 has multiple lamellae 18. The lamellae 18 delimit multiple coolant channels 20, which extend from a first surface 22 of the cooler 14 to a second surface 24 of the cooler 14. The first cooler surface 22 thus forms an outer surface of the aircraft outer skin, whereas the second cooler surface 24 forms an inner surface of the aircraft outer skin. Air can flow through the cooler 14 via coolant channels 20 which are formed in the cooler 14. The air which flows though the coolant channels 20 is used to supply cooling energy to a fuel cell system on board the aircraft. For this purpose, the cooler 14 is in the form of a heat exchanger. When cooling air flows through the coolant channels 20 of the cooler 14, the cooling energy content of the cooling air falls steadily by cooling energy transfer to the heat-generating component to be cooled. As explained in more detail below, cooling air can flow through the coolant channels 20 of the cooler 14, as shown in FIG. 2, from outside to inside, i.e., from the first cooler surface 22 in the direction of the second cooler surface 24. However, the cooling air can also be guided through the cooler 14 from inside to outside, i.e., from the second cooling surface 24 in the direction of the first cooling surface 22.

The first cooler surface 22, which forms an outer surface of the aircraft outer skin, has a structure which is suitable for reducing the frictional resistance of the first cooler surface 22 in flying operation of an aircraft equipped with the aircraft tail region 10, when air flows over the first cooler surface 22. For example, the lamellae 18 which are formed in the main body of the cooler 14 in the region of the first cooler surface 22 can form fine, sharp-edged ribs, which are essentially aligned parallel to the airflow which flows over the first cooler surface 22 in flying operation of an aircraft equipped with the aircraft tail region 10. Such a version of the first cooler surface 22 ensures that the frictional resistance of the aircraft is not increased by integration of the cooler 14 into the aircraft outer skin, but can even be reduced. This makes it possible to achieve fuel savings.

The cooler 14 also includes multiple ribs 26, which extend from the first surface 22 of the cooler 14. The ribs 26 function as flow baffles, and are aligned essentially parallel to flow lines of an airflow which flows around the first cooler surface 22 in flying operation of an aircraft equipped with the aircraft tail region 10. The ribs 26 also have a contour which is curved in the direction of the first cooler surface 22. A airflow which flows over the first cooler surface 22 in flying operation of the aircraft can be controlled as desired by the ribs 26. The ribs 26 also protect the cooler 14, and in particular the first cooler surface 22, from external influences, e.g., bird strike, ice strike, etc.

The aircraft tail region 10 also includes a fan system 28 with a radial fan, which is arranged at a second distance A2 from the transom 15 of the aircraft tail region 10. The second distance A2 is less than the first distance A1, i.e., the fan system 28 is arranged nearer the transom 15 of the aircraft tail region 10 than the cooler 14. In operation, the radial fan which is shown in detail in FIG. 3 sucks air in the axial direction, i.e., in a direction parallel to the axis of rotation R of the fan, deflects the air by 90° and finally carries the air away in a radial direction. The radial fan is mounted by means of a holding frame 30 (see FIG. 3) in the aircraft tail region 10. Alternatively, the holding frame 30 can also be a gasproof wall. A driving device 32 in the form of an electric motor, and controlled by a control unit (not shown), drives the fan system 28. The driving device 32 for driving the fan system 28 extends from the radial fan in the direction of the transom 15 of the aircraft tail region 10, and is therefore easily and conveniently accessible for maintenance and repair purposes. The driving device 32 can also be replaced quickly if required.

Finally, in the outer skin 16 of the aircraft tail region 10, a first opening 34 is formed. The first opening 34, which is formed in the outer skin 16 of the aircraft tail region 10, is positioned radially relative to the radial fan, i.e., essentially at the same distance A2 from the transom 15 of the aircraft tail region 10 as the radial fan. In flying operation of an aircraft equipped with the aircraft tail region 10, a higher pressure acts on the section of the outer skin 16 in which the first opening 34 is formed than on the section of the outer skin 16 formed by the cooler 14. In this way, in flying operation of the aircraft, ambient air can flow into the interior of the aircraft tail region 10 through the first opening 34, and be fed back into the aircraft environment through the coolant channels 20 of the cooler 14, driven by differential pressure. Operation of the fan system 28 is unnecessary for this purpose.

In ground operation of the aircraft, the driving device 32, under the control of the control unit, drives the fan system 28 so that the radial fan sucks air out of the aircraft environment through the coolant channels 20 of the cooler 14 into the interior of the aircraft tail region 10. Air is then carried out of the interior of the aircraft tail region 10 via the first opening 34, which is positioned radially to the radial fan. Both in flying operation and in ground operation of an aircraft equipped with the aircraft tail region 10, the air which is fed into the interior of the aircraft tail region 10, when it flows through the interior of the aircraft tail region 10, is fed via a fuel tank 36 of the fuel cell system to be cooled by means of the cooling system 12. In this way, the tank 36, which is suitable to receive hydrogen and arranged in the flow path of the cooling air between the cooler 14 and the fan system 28, is always sufficiently ventilated.

In the outer skin 16 of the aircraft tail region 10, a second opening 38, through which ambient air can be fed to the driving device 32 for driving the fan system 28 for cooling, is also formed. The second opening 38 is positioned so that ambient air which is fed through the second opening 38 into the interior of the aircraft tail region 10 flows directly over the driving device 32 for driving the fan system 28.

The first opening 34 which is formed in the outer skin 16 of the aircraft tail region 10 may be sealable by a conventional sealing flap 40, shown in FIGS. 4a and 4b. Alternatively, however, the first opening 34 may also be sealable by multiple lamellae 42 which extend essentially parallel to each other and may be tilted relative to the outer skin 16 of the aircraft tail region 10 (see FIGS. 5a and 5b). In the configuration shown in FIGS. 5a and 5b, the lamellae 42 in the region of the first opening 34 are integrated into an outer skin contour of the aircraft tail region 10, and can be adjusted in steps or continuously between a closed position in which they define a closed surface and seal the first opening 34, and two different open positions, in which they define a surface which can be flowed through via corresponding through-flow slits 43.

In a first open position of the lamellae 42 (see FIG. 5a), an airflow L, which flows around the outer skin 16 of the aircraft tail region 10 in flying operation of the aircraft, flows onto an inner surface 42a of the lamellae 42, which in the closed position of the lamellae 42 faces an interior of the aircraft tail region 10. The lamellae 42 thus deflect the air through the first opening 34 into the interior of the aircraft tail region 10. In contrast, in a second open position of the lamellae 42 (see FIG. 5b), the airflow L, which flows around the outer skin 16 of the aircraft tail region 10 in flying operation of the aircraft, flows onto an outer surface 42b of the lamellae 42, which in the closed position of the lamellae 42 faces away from an interior of the aircraft tail region 10.

In their first open position, the lamellae 42 generate a high ram pressure in the airflow L which flows around the outer skin 16 of the aircraft tail region 10 in flying operation of the aircraft, and consequently make it possible to feed a large air volume flow into the interior of the aircraft tail region 10. The lamellae 42 can each have the same shape. In contrast, in the configuration according to FIGS. 5a and 5b, the extent, i.e., area, of the lamellae 42 increases in the direction of the airflow L. In this way, even lamellae 42 which in the first open position of the lamellae 42 according to FIG. 5a are arranged "behind" other lamellae 42 in the direction of the airflow L still have an area onto which flow is possible, and can generate a ram pressure in the airflow L. On the other hand, if only a little air is to be fed into the interior of the aircraft tail region 10, or if air is to be carried out of the interior of the aircraft tail region 10 into the environment through the through-flow slits 43 which the lamellae 42 define, it is therefore useful to position the lamellae 42 in their second open position, to avoid increasing the air resistance and therefore the fuel consumption of the aircraft unnecessarily.

The second opening 38 which is formed in the outer skin 16 of the aircraft tail region 10 can also be sealable by a conventional sealing flap. Alternatively, however, the second opening 38 can also be sealable by multiple lamellae 42 which extend essentially parallel to each other and can be tilted relative to the outer skin 16 of the aircraft tail region 10.

A second embodiment of an aircraft tail region 10, shown in FIGS. 6*a* and 6*b*, differs from the arrangement according to FIGS. 1*a* to 1*d* in that the fan system 28, instead of a radial fan, has two or more axial fans which work redundantly. Also, the first opening 34 is positioned not in the region of a lower shell but in the region of an upper shell of the aircraft tail region 10. In the region of the first opening 34, a flap 44, which can be adjusted between a closed position and an open position, is arranged. In its closed position, the flap 44 seals the first opening 34. In contrast, in its open position, the flap 44 releases the first opening 34. Lamellae 42 which can be tilted relative to a base area of the flap 44 are integrated into the flap 44, and can be adjusted in steps or continuously between a closed position, in which they define a closed surface, and two different open positions, in which they define a surface which can be flowed through via corresponding through-flow slits 43. Otherwise, the structure and mode of operation of the aircraft tail region 10 shown in FIGS. 6*a* and 6*b* correspond to the structure and mode of operation of the aircraft tail region 10 according to FIGS. 1*a* to 1*d*.

Finally, FIGS. 7*a* and 7*b* show a third embodiment of an aircraft tail region 10, in which the two redundantly working axial fans are arranged in a flow path between the cooler 14 and the transom 15 of the aircraft tail region 10, so that the first opening 34 is positioned in the region of the transom 15. Otherwise, the structure and mode of operation of the aircraft tail region 10 shown in FIGS. 7*a* and 7*b* correspond to the structure and mode of operation of the aircraft tail region 10 according to FIGS. 6*a* and 6*b*.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. An aircraft tail region with a cooling system installed in the aircraft tail region, the cooling system comprising:
   a cooler forming a section of an outer skin of the aircraft tail region, and including coolant channels allowing a flow of ambient air therethrough, from the aircraft environment into an interior of the aircraft tail region, and extending from a first surface of the cooler to a second surface of the cooler,
   a fan system adapted to convey ambient air through the coolant channels of the cooler at least in specified operating phases of the cooling system,
   a first opening formed in the outer skin of the aircraft tail region, and which allows, in conveying operation of the fan system, ambient air which is supplied through the coolant channels of the cooler into the interior of the aircraft tail region, to be discharged back into the aircraft environment,
   wherein said section of the outer skin of the aircraft tail region is arranged at a first distance from a transom of the aircraft tail region, and the fan system is arranged at a second distance from the transom of the aircraft tail region, the second distance being less than the first distance, wherein the fan system includes a radial fan and
   wherein the first opening is arranged at the same distance from the transom than the fan system and the first opening being positioned radially relative to the radial fan of the fan system.

2. The aircraft tail region according to claim 1, wherein the cooler and the first opening which is formed in the outer skin of the aircraft tail region are positioned relative to each other so that at least in specified operating phases of the cooling system, ambient air is supplied through the first opening into the interior of the aircraft tail region, and discharged back through the coolant channels of the cooler into the aircraft environment, driven by differential pressure.

3. The aircraft tail region according to claim 1, wherein the cooler and the first opening which is formed in the outer skin of the aircraft tail region are positioned relative to each other so that at least in specified operating phases of the cooling system, ambient air is supplied through the first opening into the interior of the aircraft tail region, and discharged back through the coolant channels of the cooler into the aircraft environment, driven by differential pressure and wherein in the outer skin of the aircraft tail region, at least one second opening is formed, and ambient air is supplied through said at least one second opening to a driving device for driving the fan system for cooling.

4. The aircraft tail region according to claim 1, wherein in the outer skin of the aircraft tail region, at least one second opening is formed, and ambient air is supplied through said at least one second opening to a driving device for driving the fan system for cooling.

5. The aircraft tail region according to claim 3, wherein in the region of at least one of the first and second openings formed in the outer skin of the aircraft tail region, multiple lamellae, which essentially extend parallel to each other, are provided, the lamellae being adjustable in one of steps or continuously, between a closed position in which they define a closed surface and at least one open position in which they define a surface allowing to be flowed through via corresponding through-flow slits.

6. The aircraft tail region according to claim 5, wherein the lamellae are integrated into at least one of a flap or an outer skin contour of the aircraft tail region in the region of at least one of the first or second openings formed in the outer skin of the aircraft tail region, the flap being adjustable in one of steps or continuously, between a closed position in which the flap seals at least one of the first or second openings formed in the outer skin of the aircraft tail region, and an open position in which the flap releases the at least one of the first or second openings formed in the outer skin of the aircraft tail region.

7. The aircraft tail region according to claim 5, wherein the lamellae are adjustable into one of a first open position or a second open position, according to choice, wherein in the first open position of the lamellae, an inner surface of the lamellae, which in the closed position of the lamellae faces an interior of the aircraft tail region, is adapted to be impinged by an airflow, which flows around the outer skin of the aircraft tail region in flying operation of the aircraft, and wherein in the second open position of the lamellae, an outer surface of the lamellae, which in the closed position of the lamellae faces away from an interior of the aircraft tail region, is adapted to be impinged by an airflow, which flows around the outer skin of the aircraft tail region in flying operation of the aircraft.

8. The aircraft tail region according to claim 1, further comprising a driving device to drive the radial fan extending from the radial fan in the direction of the transom of the aircraft tail region.

9. The aircraft tail region according to claim 1, wherein a fuel tank of a fuel cell system is positioned between the cooler and the fan system.

10. A method for operating a cooling system installed in an aircraft tail region, providing a cooler which forms a section of an outer skin of the aircraft tail region and includes coolant channels allowing a flow of ambient air therethrough, and extending from a first surface of the cooler to a second surface of the cooler, a fan system, and a first opening which is formed in the outer skin of the aircraft tail region, wherein said section of the outer skin of the aircraft tail region is arranged at a first distance from a transom of the aircraft tail region, and the fan system is arranged at a second distance from the transom of the aircraft tail region, the second distance being less than the first distance, wherein the fan system includes a radial fan and wherein the first opening is arranged at the same distance from the transom than the fan system and the first opening being positioned radially relative to the radial fan of the fan system, and wherein, in the method for operating the cooling system installed in the aircraft tail region, the fan system, at least in specified operating phases of the cooling system, performs the steps of:
conveying ambient air through the coolant channels of the cooler from the aircraft environment into an interior of the aircraft tail region, and
discharging the ambient air, which is supplied through the coolant channels of the cooler into the interior of the aircraft tail region in conveying operation of the fan system, back into the aircraft environment through the first opening, which is formed in the outer skin of the aircraft tail region.

11. The method according to claim 10, wherein at least in specified operating phases of the cooling system, ambient air is supplied through the first opening into the interior of the aircraft tail region, and discharged back through the coolant channels of the cooler into the aircraft environment, driven by differential pressure, and wherein ambient air is supplied through at least one second opening, which is formed in the outer skin of the aircraft tail region, to a driving device for driving the fan system for cooling.

12. The method according to claim 11, wherein in the region of at least one of the first and second openings formed in the outer skin of the aircraft tail region, multiple lamellae, which extend essentially parallel to each other, are provided, the lamellae being adjusted, depending on the operating state of the cooling system, in one of steps or continuously, between a closed position in which they define a closed surface and at least one open position in which they define a surface allowing to be flowed through via corresponding through-flow slits.

13. The method according to claim 10, wherein the lamellae are integrated into at least one of a flap or an outer skin contour of the aircraft tail region in the region of at least one of the first or second openings formed in the outer skin of the aircraft tail region, the flap being adjusted, depending on the operating state of the cooling system, in one of steps or continuously, between a closed position, in which it seals at least one of the first or second openings formed in the outer skin of the aircraft tail region, and an open position, in which it releases the at least one of first or second openings formed in the outer skin of the aircraft tail region.

14. The method according to claim 10, wherein the lamellae are adjusted, depending on the operating state of the cooling system, into one of a first open position or a second open position, according to choice, wherein in the first open position of the lamellae, an airflow which flows around the outer skin of the aircraft tail region in flying operation of the aircraft impinges onto an inner surface of the lamellae, which in the closed position of the lamellae faces an interior of the aircraft tail region, and wherein in the second open position of the lamellae, an airflow which impinges around the outer skin of the aircraft tail region in flying operation of the aircraft impinges onto an outer surface of the lamellae, which in the closed position of the lamellae faces away from an interior of the aircraft tail region.

15. The method according to claim 10, wherein ambient air which is supplied into the interior of the aircraft tail region flows over a fuel tank of a fuel cell system, which is positioned between the cooler and the fan system, for cooling.

16. The method according to claim 10, wherein at least in specified operating phases of the cooling system, ambient air is supplied through the first opening into the interior of the aircraft tail region, and discharged back through the coolant channels of the cooler into the aircraft environment, driven by differential pressure.

17. The method according to claim 10, wherein at least in specified operating phases of the cooling system, ambient air is supplied through at least one second opening, which is formed in the outer skin of the aircraft tail region, to a driving device for driving the fan system for cooling.

18. An aircraft tail region with a cooling system installed in the aircraft tail region, the cooling system comprising:
a cooler forming a section of an outer skin of the aircraft tail region, and including coolant channels allowing a flow of ambient air therethrough, from the aircraft environment into an interior of the aircraft tail region, and extending from a first surface of the cooler to a second surface of the cooler,
a fan system adapted to convey ambient air through the coolant channels of the cooler at least in specified operating phases of the cooling system,
a first opening formed in the outer skin of the aircraft tail region, and which allows, in conveying operation of the fan system, ambient air which is supplied through the coolant channels of the cooler into the interior of the aircraft tail region to be discharged back into the aircraft environment, and
multiple lamellae located in the outer skin of the aircraft tail region of the first opening which extend essentially parallel to each other, the lamellae being adjustable in steps or continuously, between a closed position in which the lamellae define a closed surface and at least one open position in which the lamellae define a surface allowing an air flow through via corresponding through-flow slits,
wherein said section of the outer skin of the aircraft tail region is arranged at a first distance from a transom of the aircraft tail region, and the fan system is arranged at a second distance from the transom of the aircraft tail region, the second distance being less than the first distance, wherein the fan system includes a radial fan and wherein the first opening is arranged at the same distance from the transom than the fan system and the first opening being positioned radially relative to the radial fan of the fan system.

19. A method for operating a cooling system installed in an aircraft tail region, providing a cooler which forms a section of an outer skin of the aircraft tail region and includes coolant channels allowing a flow of ambient air therethrough, and extending from a first surface of the cooler to a second surface of the cooler, a fan system, and a first opening which is formed in the outer skin of the aircraft tail region, wherein said section of the outer skin of the aircraft tail region is arranged at a first distance from a transom of the aircraft tail region, and the fan system is arranged at a second distance from the transom of the aircraft tail region, the second distance being less than the first distance, wherein the fan system includes a radial fan and wherein the first opening is arranged at the same distance from the transom than the fan system and the first opening being positioned radially relative to the radial fan of the fan system, and wherein, in the method for operating the cooling system installed in the aircraft tail region, the fan system, at least in specified operating phases of the cooling system, performs the steps of:

conveying ambient air through the coolant channels of the cooler from the aircraft environment into an interior of the aircraft tail region, and discharging the ambient air, which is supplied through the coolant channels of the cooler into the interior of the aircraft tail region in conveying operation of the fan system, back into the aircraft environment through the first opening, which is formed in the outer skin of the aircraft tail region, adjusting multiple lamellae located in the outer skin of the aircraft tail region of the first opening which lamellae extend essentially parallel to each other, the adjustment occurring in steps or continuously, between a closed position in which the lamellae define a closed surface and at least one open position in which the lamellae define a surface allowing an air flow through via corresponding through-flow slits.

20. The method according to claim 17, wherein the second opening is arranged at a lesser distance from the transom of the aircraft tail region than the first opening.

21. The aircraft tail region according to claim 4, wherein the second opening is arranged at a lesser distance from the transom of the aircraft tail region than the first opening.

* * * * *